United States Patent
Cappiello et al.

(10) Patent No.: US 10,157,209 B1
(45) Date of Patent: Dec. 18, 2018

(54) MEMORY ANALYTICS

(71) Applicant: MicroStrategy Incorporated, Vienna, VA (US)

(72) Inventors: Scott Cappiello, San Marcos, CA (US); Yi Du, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 509 days.

(21) Appl. No.: 14/792,906

(22) Filed: Jul. 7, 2015

Related U.S. Application Data

(60) Provisional application No. 62/021,434, filed on Jul. 7, 2014.

(51) Int. Cl.
*G06F 7/00* (2006.01)
*G06F 17/30* (2006.01)

(52) U.S. Cl.
CPC .... *G06F 17/3053* (2013.01); *G06F 17/30554* (2013.01)

(58) Field of Classification Search
CPC .............. G06F 17/3053; G06F 17/30554
See application file for complete search history.

(56) References Cited

U.S. PATENT DOCUMENTS

| | | | |
|---|---|---|---|
| 6,687,695 B1 | 2/2004 | Miller et al. | |
| 6,826,556 B1 | 11/2004 | Miller et al. | |
| 7,024,236 B2 | 4/2006 | Ford et al. | |
| 7,769,783 B2 | 8/2010 | Rozenshtein et al. | |
| 9,454,671 B2 | 9/2016 | Engberg et al. | |
| 9,489,436 B2 | 11/2016 | Walter | |
| 2009/0287673 A1* | 11/2009 | Chronister | G06F 17/30994 |
| 2012/0233212 A1 | 9/2012 | Newton et al. | |
| 2012/0323884 A1 | 12/2012 | Draese et al. | |
| 2014/0052752 A1 | 2/2014 | Schueler et al. | |
| 2014/0344182 A1* | 11/2014 | Kapoor | G09B 7/00 705/347 |
| 2015/0074037 A1* | 3/2015 | Sarferaz | G06F 17/3056 707/602 |
| 2015/0317348 A1 | 11/2015 | Walter | |

* cited by examiner

*Primary Examiner* — Tuan A Pham
*Assistant Examiner* — Thai V Dang
(74) *Attorney, Agent, or Firm* — Fish & Richardson P.C.

(57) ABSTRACT

Methods, systems, and apparatus, including computer programs encoded on a computer storage medium, for memory analytics are disclosed. In one aspect, a method includes receiving input that requests a particular number of data items that are highest ranking in the data storage system based on a characteristic. The method includes accessing sets of data items to use in satisfying the request by selecting, from each of the independent data partitions, a set of data items that includes less than the particular number of data items that are highest ranking in the respective independent data partition based on the characteristic. The method includes comparing the sets of data items accessed from the plurality of independent data partitions. The method includes selecting the particular number of data items that are ranked highest based on the characteristic. The method includes providing, for output, the selected particular number of data items.

20 Claims, 9 Drawing Sheets

FIG. 6

Wisdom PROFESSIONAL    DASHBOARD    DEMOGRAPHICS    INTERESTS    PLACES    PSYCHOGRAPHICS SCORES

Page — Search Page (610)

- ▶ Page
- ✓ Apply
- All Wisdom ▾
- Search Page
- ▼ Gender — All
  - ☐ (All)
  - ☐ Underclared
  - ☐ Female
  - ☐ Male
- ▲ Age Bracket — All
- ▲ Relationship Status — All
- ▲ Education Level — All
- ▲ Income Bracket — All
- ▲ Urbanicity — All
- ▲ Country — All
- ▲ State Territory — All
- ▲ Metro — All
- ▲ Country of Origin — All
- ▲ Language — All
- ▲ Psychographic Profile — All
- ▲ Affluence Bracket — All
- ▲ Influence Bracket — All
- ▲ Popularity Bracket — All
- ▶ Place — All Search Page

Analysis / Comparison (630) — Summary | Index

Wisdom Snapshot | 19.4M PEOPLE | 1.9B PAGE LIKES | 145,038 CITIES | 100 AVG PAGE LIKES | 333 AVG # OF FRIENDS | 333 AVG AGE Export: [PDF]

19,494,077 People in filter selection — 620

Demographics — 640
Average Age: 32

- Under 17 — 3%
- 17-28 — 45%
- 29-35 — 21%
- 36-45 — 17%
- Over 47 — 14%

■ Married    ■ Attended College    ■ Urban 418a-a, 418a-b, 418a-c

48% are women    52% are men

Interests

| Overall — 622a | Music — 622b | Movies — 622c | Sports — 622d | Companies/Products — 622e |
|---|---|---|---|---|
| 1. Facebook | 1. Michael Jackson | 1. Megan Fox | 1. Cristiano Ronaldo | 1. Facebook |
| 2. Barack Obama | 2. Eminem | 2. Will Smith | 2. Michael Jordan | 2. YouTube |
| 3. Family Guy | 3. Lady Gaga | 3. Tha Hangover | 3. Leo Messi | 3. Starbucks |
| 4. YouTube | 4. Bob Marley | 4. Harry Potter | 4. FC Barcelona | 4. Coca-Cola |
| 5. House | 5. The Beatles | 5. Vin Diesel | 5. Basketball | 5. Disney |

Location & Language
Top Metro Areas    Top Countries    Top Languages    Most Popular in

600

MEMORY ANALYTICS

CROSS-REFERENCE TO RELATED APPLICATION

This application claims the benefit of U.S. Patent Application No. 62/021,434, filed Jul. 7, 2014, the contents of which are incorporated by reference.

TECHNICAL FIELD

This description relates to data processing.

BACKGROUND

Computer systems are used to manage and store data in a structure known as a database. As such, computers can be used to analyze data and generate reports based on the analysis results. For instance, computer systems can filter data and calculate metric values based on the filtered data, ultimately providing a report including the calculated metric values. A database is an organized repository of data. There are various ways in which the data can be organized. Schemas are used to describe the different organizations of data.

Computers systems have two types of physical data storage—disk (e.g., hard drive) storage and Random Access Memory (RAM) storage. Typically, computer systems have more disk storage than RAM, but it can often take longer (e.g., in the range of 100-1,000 times longer) to read data from the disk than from RAM. This can result in noticeable performance degradation. With the advent of in-memory processing, the data is loaded into the RAM (or sometimes, flash memory) instead of disk storage. This allows for faster query execution when dealing with large amounts of data.

SUMMARY

An innovative aspect of the subject matter described in this specification may be implemented in a method that includes the actions of receiving, by a data storage system, input that requests a particular number of data items that are highest ranking in the data storage system based on a characteristic, where the data storage system includes a plurality of independent data partitions; accessing sets of data items to use in satisfying the request by selecting, from each of the independent data partitions, a set of data items that includes less than the particular number of data items that are highest ranking in the respective independent data partition based on the characteristic; comparing the sets of data items accessed from the plurality of independent data partitions; based on comparison results, selecting, from among the sets of data items accessed from the plurality of independent data partitions, the particular number of data items that are ranked highest based on the characteristic; and providing, for output, the selected particular number of data items.

These and other implementations can each optionally include one or more of the following features. A number of the sets of data items accessed from the plurality of independent data partitions is equal to the particular number. The actions include identifying the independent data partition associated with each of the sets of data items accessed from the plurality of independent data partitions; and adjusting, for subsequent data queries, a number of the sets of data items selected from each of the independent data partitions. The action of adjusting the number of the sets of data items selected from each of the independent data partitions includes increasing the number of the less than the particular number of data items selected from each of the independent data partitions. The action of adjusting the number of the sets of data items selected from each of the independent data partitions includes decreasing the number of the less than the particular number of data items selected from each of the independent data partitions.

The actions include associating each of the plurality of independent data partitions with at least one of a plurality of processing units such that one or more data sets in a corresponding each of the plurality of independent data partitions are processed by the at least one of the plurality of processing units; and providing a query execution engine for causing the plurality of processing units to execute, in parallel, a series of data queries to the plurality of independent data partitions. The action of providing, for output, the selected particular number of data items includes presenting within a dashboard a visualization of the selected particular number of data items. The actions include generating the data query based on data inputted into the dashboard. The plurality of independent data partitions are distributed over a plurality of nodes, each node including one or more of the plurality of processing units. The actions include monitoring a processing status of the plurality of processing units; and balancing a processing load across the plurality of processing units in response to the monitored processing status.

The action of accessing sets of data items to use in satisfying the request by selecting, from each of the independent data partitions, a set of data items that includes less than the particular number of data items that are highest ranking in the respective independent data partition based on the characteristic includes determining a number of the less than the particular number of data items based on (i) a number of the independent partitions, (ii) a number of data items stored in each of the independent partitions, and (iii) the particular number of data items. The actions include identifying independent data partitions that are associated with each of the selected particular number of data items; determining that each of the selected particular number of data items is associated with a same independent data partition; and accessing each data item that is stored in the same independent data partition.

Other features may include corresponding systems, apparatus, and computer programs encoded on computer storage devices configured to perform the foregoing actions.

Another innovative aspect of the subject matter described in this specification may be implemented in a method that includes the actions of receiving, by a data storage system, input that requests information that is associated with data stored in a plurality of independent data partitions; identifying a number of the independent partitions and an amount of the data stored in each of the independent partitions; based on the number independent partitions and the amount of the data stored in each of the independent partitions, accessing sets of data items from the plurality of the independent data partitions; based on the accessed sets of the data items from the plurality of the independent data partitions, determining an estimate of the information; and providing, for output and as the information, the estimate of the information.

These and other implementations can each optionally include one or more of the following features. The action of based on the number independent partitions and the amount of the data stored in each of the independent partitions, accessing sets of data items from the plurality of the independent data partitions includes determining a probability of determining the information based on the number independent partitions and the amount of the data stored in each of the independent partitions; and determining, based on the probability, a number of sets of data items to access from each of the plurality of the independent data partitions. The actions include identifying the independent data partitions associated with each the accessed sets of the data items; and adjusting, for subsequent data queries, a number of the sets of data items accessed from each of the independent data partitions.

The actions include identifying independent data partitions that are associated with each of the accessed sets of the data items; determining that each of the accessed sets of data items is associated with a same independent data partition; and accessing each data item that is stored in the same independent data partition. The actions include associating each of the plurality of independent data partitions with at least one of a plurality of processing units such that one or more data sets in a corresponding each of the plurality of independent data partitions are processed by the at least one of the plurality of processing units; and providing a query execution engine for causing the plurality of processing units to execute, in parallel, a series of data queries to the plurality of independent data partitions. The actions include monitoring a processing status of the plurality of processing units; and balancing a processing load across the plurality of processing units in response to the monitored processing status. The action of providing, for output and as the information, the estimate of the information includes presenting within a dashboard a visualization of the selected particular number of data items.

Other features may include corresponding systems, apparatus, and computer programs encoded on computer storage devices configured to perform the foregoing actions.

Another innovative aspect of the subject matter described in this specification may be implemented in a method that includes the actions of determining a number of independent data partitions in a data storage system; determining an amount of data stored in each independent data partition; determining a subset of data from each independent data partition needed to ensure that an estimated result of a computation satisfies a particular confidence level based on the determined number of independent partitions and the determined amount of data in each independent data partition; accessing, from each partition, the determined subset of data from each independent data partition; performing the computation based on the accessed subset of data from each independent data partition; and outputting a result of the computation.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

BRIEF DESCRIPTION OF THE DRAWINGS

FIGS. 6 and 7 illustrate example user interfaces of an intelligence dashboard.

Like reference numbers represent corresponding parts throughout.

DETAILED DESCRIPTION

This application describes techniques to compute an approximate result by accessing only a portion of partitioned data. A system analyzes the number of partitions and the amount of data in each partition. Based on the number of partitions and the amount of data in each partition, the system determines, using probability calculations, the amount of data that the system should access to compute a result that will likely satisfy a confidence threshold. For example, to achieve a result that will be ninety percent accurate, a system may determine that it only needs to access fifteen percent of each partition. In the following disclosure, FIGS. 3-9 and the associated descriptions relate to data storage technology that may be used to perform complex analytic techniques. Complex analytic techniques that may be implemented using the systems described with reference to FIGS. 3-9 are discussed in more detail with reference to FIGS. 1-2.

Figure 1:
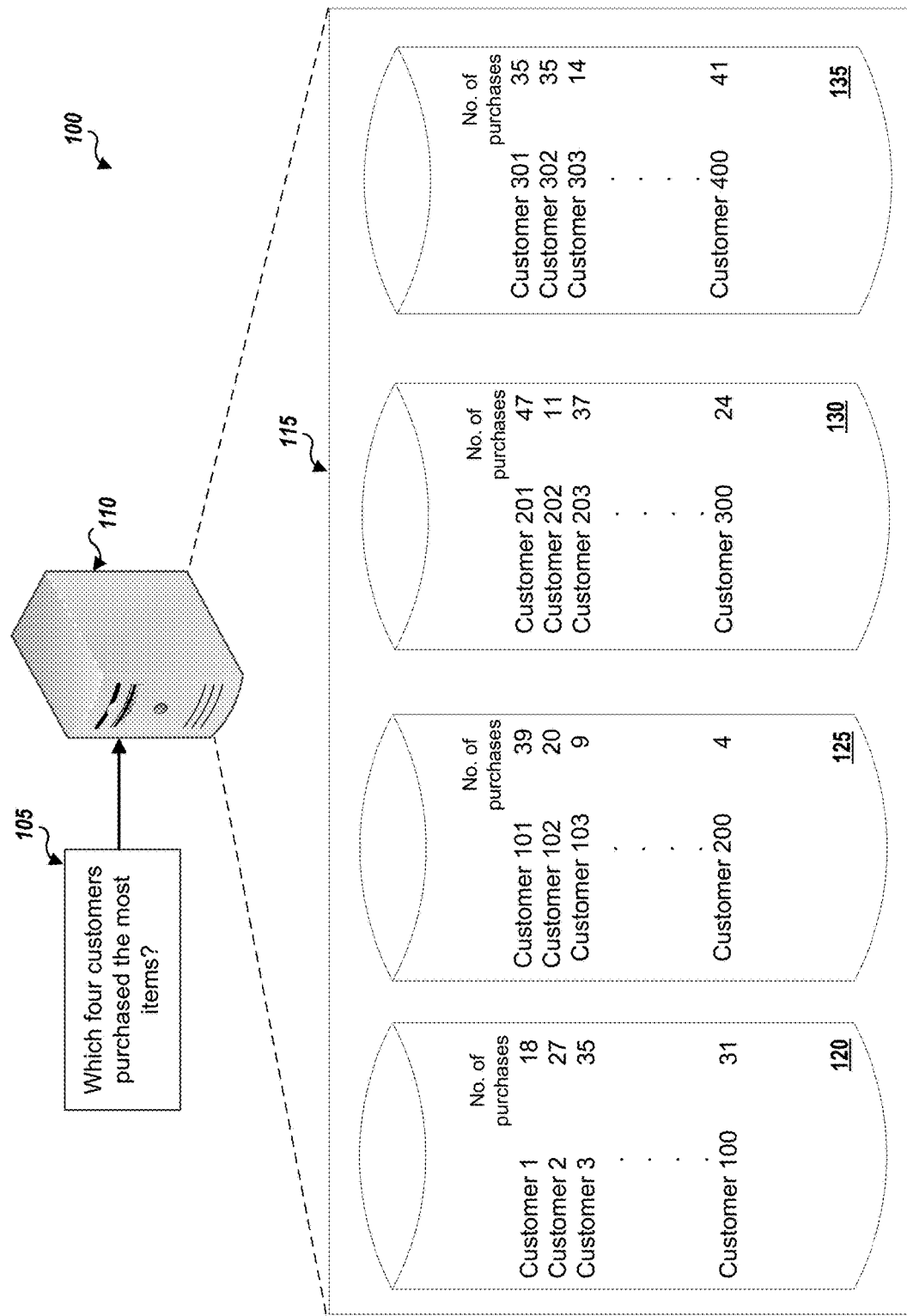
FIG. 1 illustrates an example data storage system that is receiving an example data query.

FIG. 1 illustrates an example data storage system 100 that is receiving an example data query 105. In general, the data storage system 100 processes the data query 105 and accesses data stored in data partitions 120, 125, 130, and 135. The data portions 120, 125, 130, and 135 are stored on a data storage device 110. The data storage system 100 accesses only a portion of the data stored in the data partitions 120, 125, 130, and 135 to respond to the data query 105.

The data storage device 110 receives the data query 105. The data query 105 may be received from a user of the data storage device 110 through a dashboard application running on the data storage device 110. The user may be requesting data that is stored in the data storage device 110 and that has a particular characteristic. As the example in FIG. 1 illustrates, the user request the four customers who have purchased the most items.

The data storage device 110 includes multiple independent data partitions 120, 125, 130, and 135 that are stored in the data storage 115 of the data storage device 110. In some implementations, the data storage system 100 may include multiple data storage devices each with data storage. In that implementation, the user would query the data storage system 100 and the data storage system 100 would provide the query to each data storage device. In some implementations, the data store 115 is an in-memory data storage that is divided into partitions such as independent data partitions 120, 125, 130, and 135. Each independent data partition 120, 125, 130, and 135 may include its own processing unit.

The data storage device 110 accesses sets of data items in each of the independent data partitions 120, 125, 130, and 135. Each independent data partition 120, 125, 130, and 135 stores different data and may be accessed in parallel by the data storage device 110. For example, the data storage device 110 may read data from independent data partitions 120 while also reading data from independent data partition 125. Depending on the query and the type of data stored in the data storage 115, the data storage device 110 may access only particular data sets each independent data partition to approximately satisfy the query.

In the example illustrated in FIG. 1, the user queries the data storage system 100 for the four customers who have purchases the most items. With different customer data stored on each independent data partition, one way for the data storage system 100 to determine the top four customers is to access the top four customers from each of the independent data partitions 120, 125, 130, and 135, combine all the received customer data, rank the customers by number of items purchases, and outputting the top four to the user. Instead of this technique, the data storage system 100 accesses only a portion of each independent data partition to determine an approximate response to the search query 105.

As shown in FIG. 1, each independent data partition contains one hundred data items and the values for four of the data items is shown. The customer who has purchased the most items is customer 201 with forty seven items. The next three customers with the most purchased items are customer 400, customer 101, and customer 203.

In some implementations, the data storage system 110 accesses the top customer from each independent data partition. In the example illustrated in FIG. 1, the top customer in independent data partition 120 is customer 3 with thirty-five purchases. In independent data partition 125, the top customer is customer 101 with thirty-nine purchases. In independent data partition 130, the top customer is customer 201 with forty-seven purchases. In independent data partition 135, the top customer is customer 400 with forty-one purchases. Combining the top customer from each independent data partition yields customers 3, 101, 201, and 400, which is only one customer off from the correct result. To identify customers 3, 101, 201, and 400, the data storage system 110 only needed to access each independent data partition once instead of four times.

In some implementations, the data storage system 110 accesses the top two customers from each independent data partition. In the example illustrated in FIG. 1, the top customers in independent data partition 120 are customers 3 and 100 with thirty-five and thirty-one purchases, respectively. In independent data partition 125, the top customers are customers 101 and 012 with thirty-nine purchases, respectively. In independent data partition 130, the top customers are customers 201 and 203 with forty-seven and thirty-seven purchases, respectively. In independent data partition 135, the top customers are customers 301, 302, and 400 with thirty-five, thirty-five, and forty-one purchases, respectively. Combining the top customers from each independent data partition yields customers 101, 201, 203, and 400, which is the correct result. To identify customers 101, 201, 203, and 400, the data storage system 110 only needed to access each independent data partition twice instead of four times.

Without having previously accessed the independent data partitions 120, 125, 130, and 135 to identify the top customers, the data storage system 100 does not have enough information to only access each independent data partition an optimal number of times. Instead, the data storage system 100 uses known information to determine a number of times to access each independent data partition that will yield a result that is a good enough approximation. The known information that the data storage system 100 may use includes the number of data items requested in the query, the number of independent data partitions, the number of data items in each independent data partition, the load of the data storage system 100, the load of each independent data partition, results from previous queries.

For example, the data storage system 100 with the information that the query requests four data items, there are four independent data partitions, each independent data partition contains one hundred data items, and the load of each independent data partition is low, the data storage system 100 may determine that accessing each independent data partition three times would yield a result that is approximate enough. As described above, accessing each independent data partition three times yields an accurate result. The data storage system 100 may analyze the results from this data query and determine that no more than two of the top data items were from the same independent data portion.

In processing a subsequent query that requests the top six customers, the data storage system 100 may utilize the result from the previous query in determining how many times to access each independent data partition. That data contained in each independent data partition may have changed since processing the last data query because more customers may have purchased more items. The data storage system 100, with the information that when determining the top four items, no more than two of the top data items were from the same independent data portion, may determine that accessing the top three data items from each independent data portion yields a result that is approximate enough.

Figure 2:
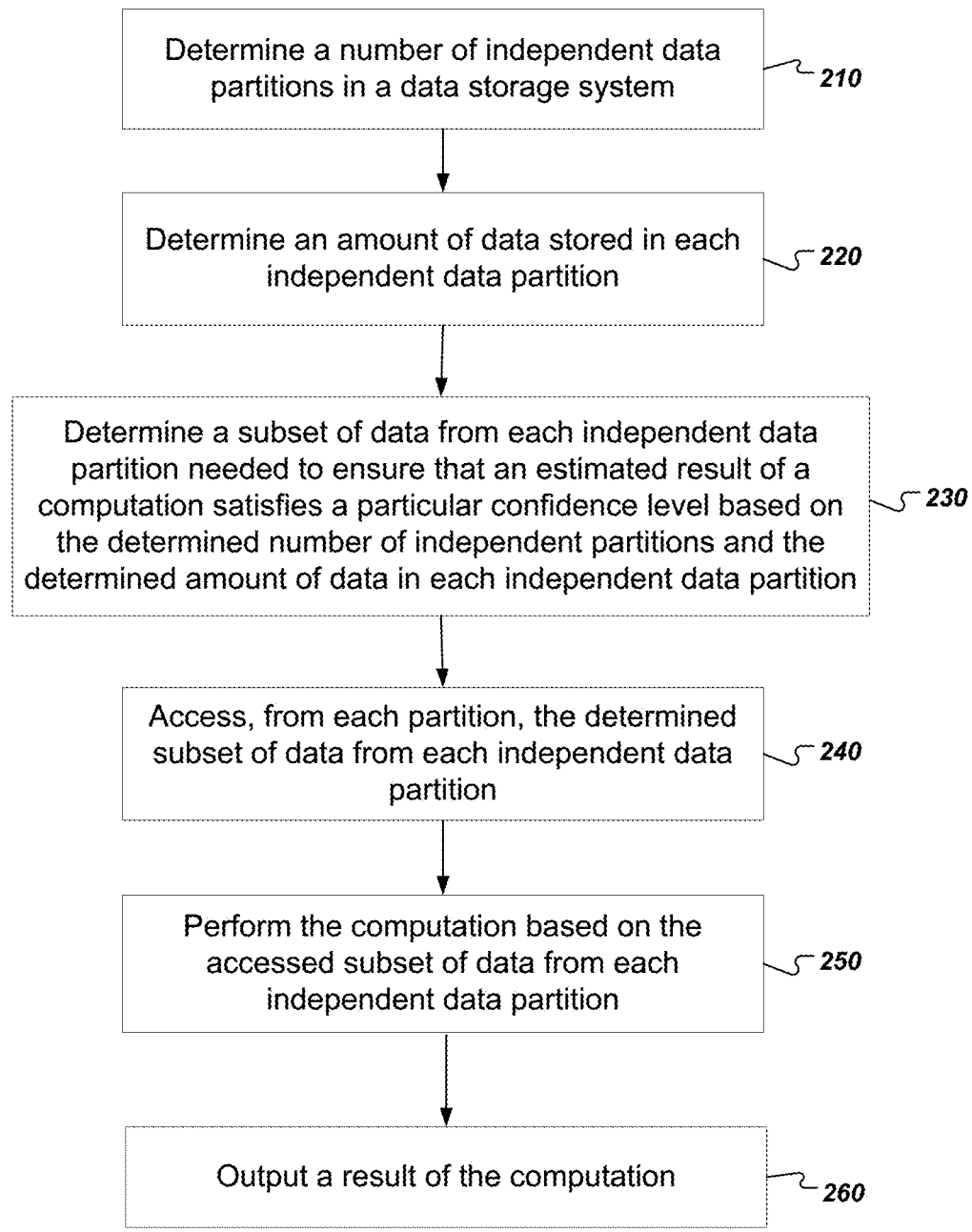
FIG. 2 illustrates an example process for performing a computation with a data storage system.

FIG. 2 illustrates an example process 200 for performing a computation with a data storage system. In general, the process 200 is performed by a data storage system, for example, data storage system 100 from FIG. 1. The system performs the computation by accessing independent data partitions of the system.

The system determines a number of independent data partitions in a data storage system (210). Each independent data partition contains unique data sets. In some implementations, the independent data partitions are included in different data storage devices and each data storage device an access its independent data partitions in parallel.

The system determines an amount of data stored in each independent data partition (220). Each independent data partition contains a number of data sets and the data sets may be the same size, similar size, different sizes. In some implementations, the amount of data stored in each independent data partition may be number of bytes stored in each independent data partition, such as 1 terabyte, or the number of data items stored in each independent data partition, such as one thousand data items The system determines a subset of data from each independent data partition needed to ensure that an estimated result of a computation satisfies a particular confidence level based on the determined number of independent partitions and the determined amount of data in each independent data partition (230). To determine the result of a computation, the system may need to access all of the data stored in each independent data partition. Accessing all the data may consume a lot of the system resources if each independent data partition contains an amount of data that the system cannot quickly access. As such, the system may use probability calculations, the number of independent partitions, and the amount of data in each independent data partition to determine an amount of data needed to determine a subset of data to access from each independent data partition to obtain a result that is accurate enough. A result that is accurate enough may be one that satisfies a confidence threshold associated with the data. The system may also consider the system load. In instances where the system is experiencing heavy load, then the system may decrease the confidence threshold. In instances where the system is experiencing light load, then the system may increase the confidence threshold. For example, a system may be required to provide a result within three seconds. If the system is experiencing heaving load and cannot provide a result that satisfies the confidence threshold within three seconds, then the system may decrease the confidence threshold in order to provide a result within three second. Alternatively, if the system can provide a result that satisfies the confidence threshold within one second, then the system may increase the confidence threshold to gain more accuracy but still provide a result within three seconds.

To illustrate the confidence threshold, a system receives the query requesting the one hundred customers who have purchased the most items. The customer data is stored in ten independent data partitions and each independent data partition contains one thousand record. The system uses a confidence threshold of ninety percent. The system calculates using probability that accessing the top fifteen customers from each data partitions would likely yield a result that is ninety percent accurate. To obtain a result that would be one hundred percent accurate, the system would need to access the data of one hundred customers from each independent data partition. Instead, the system achieves ninety percent accuracy with eighty-five percent less accesses to the data partitions.

The system accesses, from each partition, the determined subset of data from each independent data partition (240) and performs the computation based on the accessed subset of data from each independent data partition (250). In some implementations, the system analyzes the independent data partition that is associated with different parts of the subset of data. The system may determine that the much of the subset of data used in the computation was from the same independent data partition. In this instance, the system may increase the confidence threshold for future computations. Alternatively, the system may determine that of the subset of data used in the computation, much of the used portion of the subset of data were from different independent data partitions. In this instance, the system may decrease the confidence threshold for future computations. The system may use different confidence thresholds for different types of computations.

Figure 3:
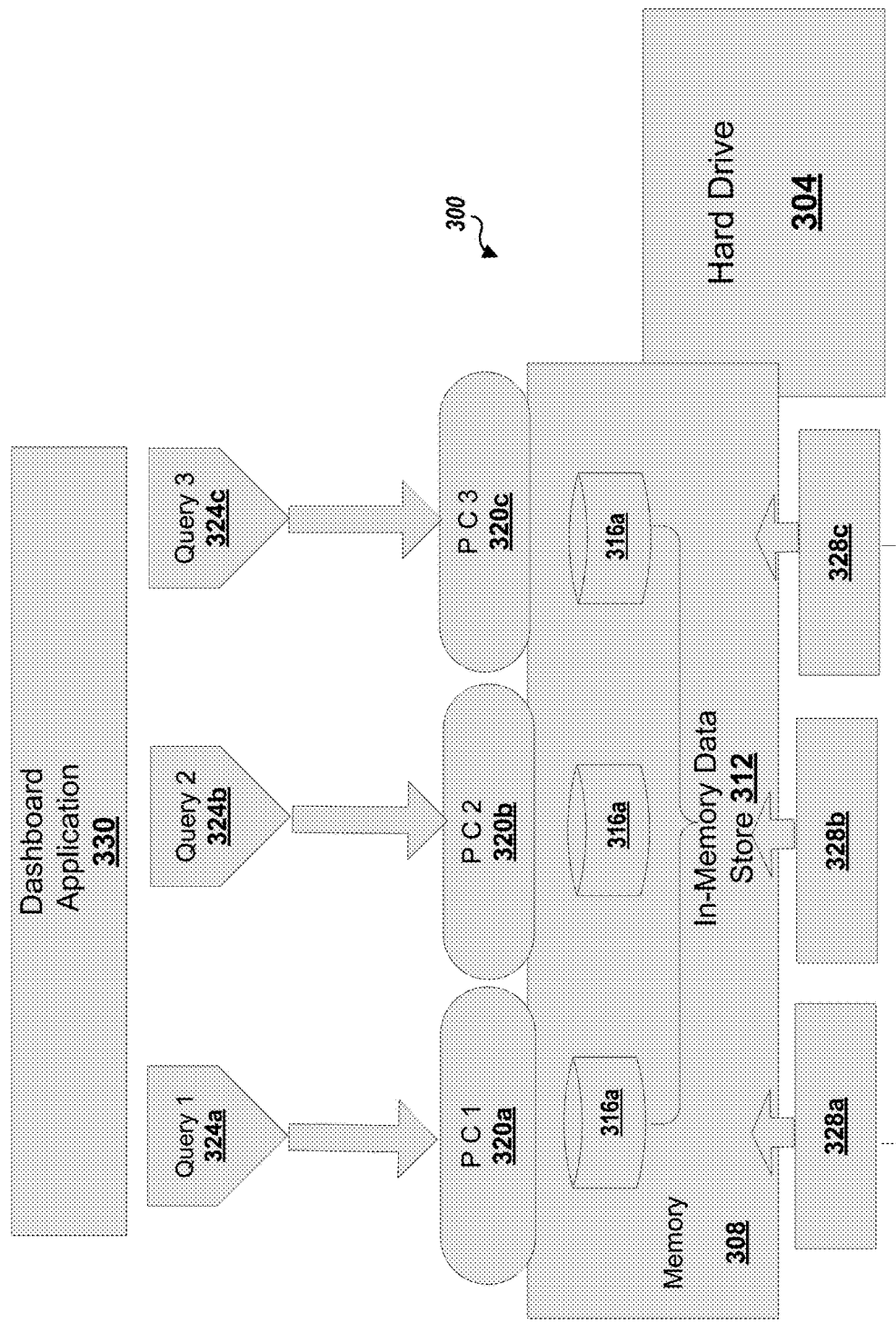
FIG. 3 is a block diagram of an example architecture of an in-memory analytic data store.

The system outputs a result of the computation (260). In some implementations, the system outputs the result to a dashboard application for the dashboard application to display a visual representation of the FIG. 3 shows an example conceptual diagram of a computer system 300. For example, computer system 300 can be implemented on or more computers (or nodes). As shown, computer system 300 can be conceptually represented as having two data storage areas, a hard disk 304 and a memory 308. The computer system 300 includes a dashboard application 330. Dashboard application 330 can include an interface (as described in detail below) for displaying grids and graphs based on underlying data to a user.

For example, memory 308 can be a random access memory or a flash memory. In some implementations, memory 308 allows data items to be read and written in a substantially similar amount of time regardless of an order in which the data items are access. In this regard, memory 308 can be different from, for example, hard disk 304 where the time to read and write data items can vary significant depending on the physical locations of the data items in the recording medium and because of, e.g., mechanical limitations such as media rotation speeds and arm movement delays.

Memory 308 includes an in-memory data store 312. For example, the in-memory data store can be partitioned into one or more data sub sets 316a-c. For example, one or more data sub sets 316a-c can include partitions (e.g. a portion) of one or more tables within data store 312. Although three data sub sets 316a-c are shown and described here, there can be fewer or more (perhaps several more) than the three data sub sets 316a-c. Each data sub set 316a-c is associated with one or more processing units 320a-c. Although three processing units 320a-c are shown and described here, there can be fewer or more (perhaps several more) than the three processing units 320a-c. In some examples, a processing unit 320a can be associated with more than one data sub set 316a-c.

For example, processing units 320a-c can be one or more processor cores of a multi-core processor. For examples, multi-core processors can have two cores (dual-core CPUs, for example AMD Phenom II X2 and Intel Core Duo), four cores (quad-core CPUs, for example AMD Phenom II X4, Intel's i5 and i7 processors), six cores (hexa-core CPUs, for example AMD Phenom II X6 and Intel Core i7 Extreme Edition 980X), eight cores (octo-core CPUs, for example Intel Xeon E7-2820 and AMD FX-8350), ten cores (for example, Intel Xeon E7-2850), or more. In some implementations, a multi-core processor implements multiprocessing in a single physical package.

In some implementations, the computer system 300 can be implemented across multiple nodes. For example, a first processing unit 320a can each be a processor core of a multi-core processor in a first node, and a second processing unit 320b can be a processor core of a multi-core processor in a second, different, node. In some implementations, while processing unit 320a is physically located in a first node (e.g. a first processor core in the first node), processing units 320b and 320c can be physically located in a second, different node (e.g. second, different processor cores in the second node). In some implementations, data sub set 316a can be physically located in the first node, and data sub sets 316b and 316c, corresponding respectively to each of processing units 320b and 320c, can be physically located in the second, different node. Although a few example combinations of processor cores and partitioned data sets are described here, a person of ordinary skill in the art would understand that any number of combinations of processor cores and partitioned data sets, spread out over a single node or multiple nodes, are possible.

In some examples, one or more database transactions can be processed in the form of one or more queries 324a-c to the in-memory analytic data store 312. For example, a high level database transaction can be divided into the multiple queries 324a-c. In some examples, the number of queries 324a-c can be as high as a number of parallel processing units 320a-c that are available to process the queries 324a-c in parallel. As shown, the queries 324a-c can be processed in parallel by the respective processing units 320a-c. For example, query 324a may require the summation of a column of data (e.g., numbers) residing in a portion of the data sub set 316a. For example, the column of data relates to sales made by a customer over a period of time. This summation operation can be handled by respective processing unit 320a. Substantially at the same time, a different (but perhaps related) operation, .e.g. retrieving transaction dates for the sales fields being processed through the summation operation, can be handled by processing unit 320b operating on data sub set 316b. The results from respective queries 324a and 324b can be sent back to a query engine (see e.g. FIG. 4 described in further detail below) to assemble the information for, e.g., final display.

For example, computer systems implementing the techniques described herein (e.g. computer system 300 of FIG. 3) uses information about an application and/or design aspects of a dashboard application 330 to generate queries 324a-c to the in-memory data store. For example, dashboard application 330 can include a dashboard interface, as described in detail below, in which two or more grids (e.g. tables of data) are based on same or similar content. In some implementations, the computer system 300 can cause a single combined query (e.g., only query 324a) or parallel queries (e.g., queries 324a-c) to be executed on the in-memory data store for the two or more grids. In some implementations, dashboard application 330 can have two visualizations representing, e.g. sales trends over time through both a line chart and a grid of data. In the computer system 300, the data needed for the two visualizations can be the same and so can be based on a either a single query or multiple parallel queries to in-memory analytic data store 312. In some examples, dashboard application 330 can include two visualizations (not shown) based on selecting key performance indicators (KPIs) from a same set of underlying data in in-memory data store 312. Because the underlying data involved is the same, the visualizations can be executed together—i.e. a single query or multiple parallel queries can be executed together. In some implementations, dashboard application 330 can include visualizations that are based on same or similar filtering criteria, and as such queries corresponding to these visualizations can be combined into a single query and/or executed together.

In some implementations, a data service engine 328 can receive data from multiple high volume data storage systems and load the received data into in-memory data store 312. In some examples, data service engine 328 can perform parallel data loading into data store 312 through parallel processes 328a-c. For example, processes 328a-c can load data from a corresponding data sources (not shown) into respective in-memory data store sub sets 316a-c in parallel. In some implementations, the loaded data can be all of the market intelligence data needed to generate output for an end application, e.g., a dashboard/visualization engine as described in further detail below.

The in-memory analytic data store 312 can enable bigger data volume given its partitioned and parallel processing structure. For instance, current in-memory technologies are limited to two billion rows. By dividing datasets into partitions (e.g., data store sub sets 316a-c), each partition or sub set 316a-c can have up to two billion rows, which increases the overall data volume. The partitioning can be performed on a single node or over multiple nodes as described below. For single node partitioning, data partitions are distributed across multiple cores on a single machine and grids/views are processed in parallel across all cores on a single multi-processor node. For multiple node partitioning, data partitions are distributed within and across multiple nodes (e.g., machines) and queries processed in parallel within and across multiple nodes.

In some implementations, the in-memory analytic data store 312 can provide broader analytic functionality. For instance, current in-memory cubes do not support full filter and metric functionality. In current in-memory cubes, "single pass" queries can be executed on underlying data. As such, complex business questions, such as, returning regional sales for those customers that bought certain widgets worth more than a predetermined number, could not be run on the data. The in-memory analytic data store 312, however, extends to "multi-pass" analytics with multiple levels of aggregation and/or filtering. For example, computer system 300 can process metrics having conditions. In some examples, computer system 100 can also set qualification filters on the data.

Figure 4:
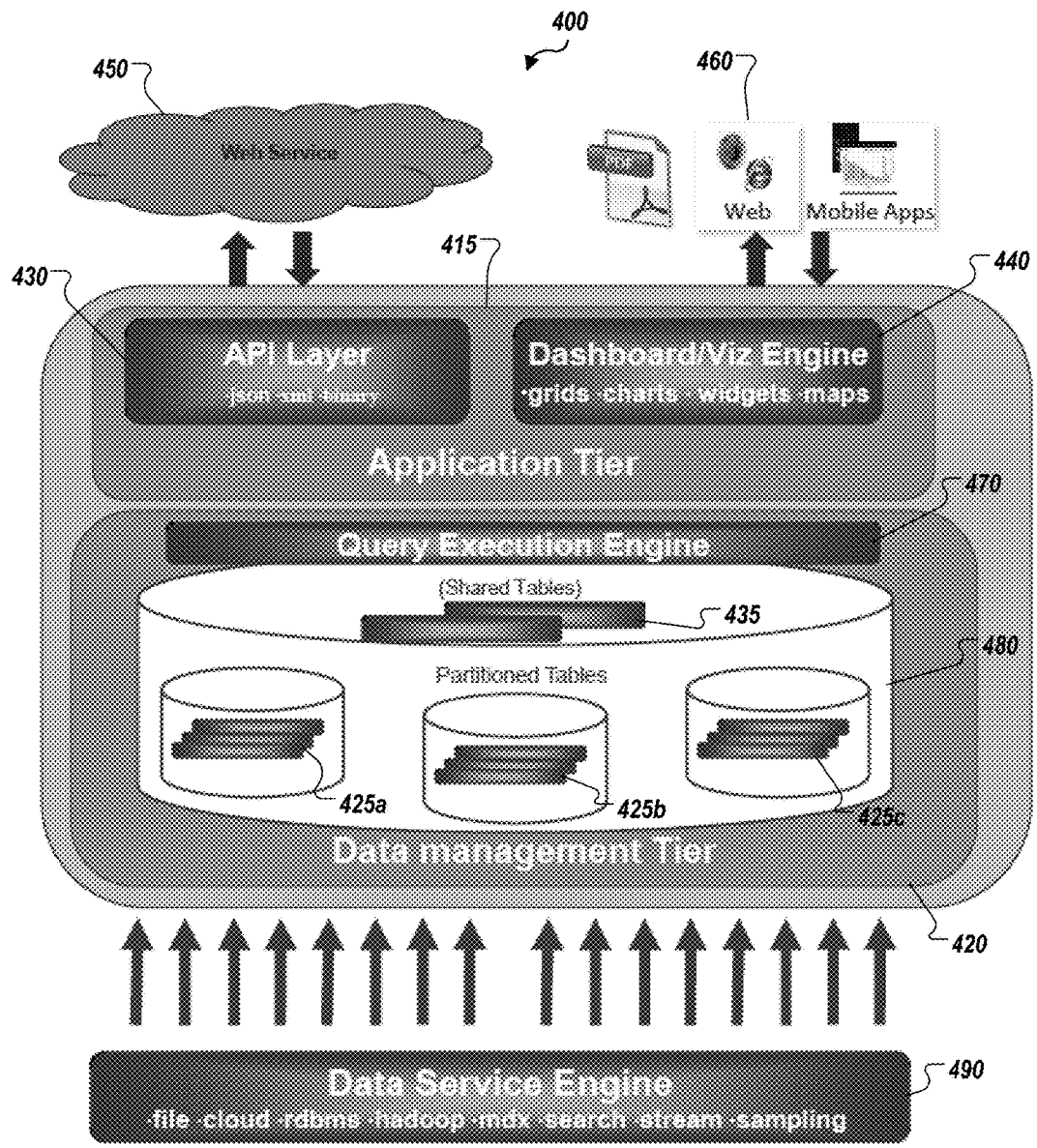
FIG. 4 is a block diagram illustrating an example architecture of a node.

In some implementations, the computer system of FIG. 3 can be implemented on a single node. Referring to FIG. 4, an example architecture of a single node 400 is shown. Node 400 can be a server implementing an in-memory analytic data store 480. Node 400 can include an application tier 415, a data management tier 420, and a data service engine 490. Application tier 415 includes an application programming interface (API) layer 430 and an intelligence dashboard/visualization engine 440. For example, API layer 430 includes specifications describing how components in data management tier 420 can interact with other components, e.g., one or more web services 450. For example, API layer 430 interfaces with web services 450 to receive data from one or more other applications (e.g., market intelligence data) and/or to provide collaborative functionality with the one or more other applications (e.g., receive user input from the one or more other applications and provide data to be output by the one or more other applications).

Dashboard/visualization engine 440 interacts with one or more of web applications, mobile applications, and documents 460 to receive user input and provide user output. For instance, dashboard/visualization engine 440 can generate a user interface 600 as shown in FIG. 6. For example, dashboard/visualization engine 440 can interact with a web or mobile application to output the user interface 600 on a user's device, e.g. a handheld device. Dashboard/visualization engine 440 also can output user interface 600 as a document or file that a user device is able to store and display. Application tier 410 can be a tightly-coupled with globally optimized query execution across multiple visualizations in single dashboard. Application tier 410 can also include a "data-only" JSON REST API and can provide super-fast search-style selectors.

Data management tier 420 can include a query execution engine 470 and an in-memory data store 480. Query execution engine 470 receives queries (similar to queries 324a-c described in connection with FIG. 3) from application tier 410 and processes the received queries on data stored in in-memory data store 480. Query execution engine 470 can access data from the in-memory data store 480, perform analytics on the accessed data, and provide, to the application tier 415, the accessed data and/or the results of the performed analytics. In some implementations, query execution engine 470 can divide a database transaction into a plurality of queries for processing on the respective data partitions.

In-memory data store 480 can be partitioned as shown. In some implementations, in-memory data store 480 can be partitioned to include, e.g., multiple partitioned tables 425a-c and one or more shared tables 435 that are stored in-memory. In some implementations, while each of the partitioned tables 425a-c is associated with a corresponding processor core, shared tables 435 can be accessed by multiple processor cores at substantially the same time. For example, the in-memory data store 480 can include a customer transactions table that can be partitioned such that each of the partitioned tables 425a-c has one million customer transaction entries. In some implementations, a shared table can be a customer table that is shared among two or more processor cores.

Query execution engine 470 is configured to process queries to multiple partitioned tables 425a-c and one or more shared tables 435 in parallel to provide fast data retrieval and enable a larger volume of data to be stored in-memory. For example, partition tables 425a-c can include a plurality of customer transaction records. Data management tier 420 can be a high-performance in-memory data tier that performs distributed in-memory analytics on the customer transaction records.

As explained above, data management tier 420 can have data partitioned across multiple processing cores and can perform parallel execution of queries across all cores according to a partition logic. In some implementations, a partition attribute can be defined to couple the processing cores to the respective data partition table e.g., any one of partition tables 425a-c. For example, if a partition table 425a contains customer transaction information, a customer transaction attribute such as a transaction identification code ("ID") can be used as a partition attribute. In this regard, in some examples, the transaction ID can be processed through a hash function and sent to partition tables 425a-c to determine which partition 425a-c has the corresponding transaction information. In some implementations, while multiple customers can be located in a partition table 425a, a customer located on partition table 425a can remain on that partition table 425a indefinitely (e.g., until the customer record is reallocated elsewhere).

Data service engine 490 can receive data from multiple high volume data storage systems and load the received data into the in-memory data store 480 in the data management tier 420. The data service engine 490 can perform parallel data loading into the in-memory data store 480 from multiple data sources. The loaded data can be all of the market intelligence data accessible to generate output through the dashboard/visualization engine 440. For example, data service engine 490 loaded information can be based on one or more of information contained on files, the cloud, a relational database management system (RDMBS), information from Apache Hadoop (an open source software framework for large scale storage and processing of data), multidimensional expressions (MDX), search query results, stream, and sampling information.

In some implementations, any arbitrary schema can be loaded into the in-memory analytic data store. In some implementations, the in-memory analytic data store 480 can be loaded with multiple star schemas and not just a single star schema. A star schema organizes a database such that business process data is separated into facts, which hold measurable, quantitative data about a business, and dimensions which are descriptive attributes related to the facts. For example, facts can include sales price, sale quantity, and time, distance, speed, and weight measurements. Related dimension attribute can include product models, product colors, product sizes, geographic locations, and salesperson names. In one star schema, the data is organize such that the fact table is typically located at the center of the star schema with the dimension table surrounding the fact table. Thus, multiple star schemas can each have a facts table at its center and a plurality of associated dimensional tables surrounding the facts tables.

In some implementations, fact tables at multiple levels can be loaded into the in-memory analytic data store. As an illustration, a first star schema can include sales transactions information, including customer information, transaction detail at a timestamp level, and store of purchase information. A second star schema can include store inventory information, such as products information, sales associates' information, and purchase information at a weekly inventory level. A third star schema can include corporate-level pricing data. Thus, each star schema represents data at a different level of granularity and detail. In some implementations, the in-memory analytic data store 480 can be loaded with all such star schemas.

Figure 5:
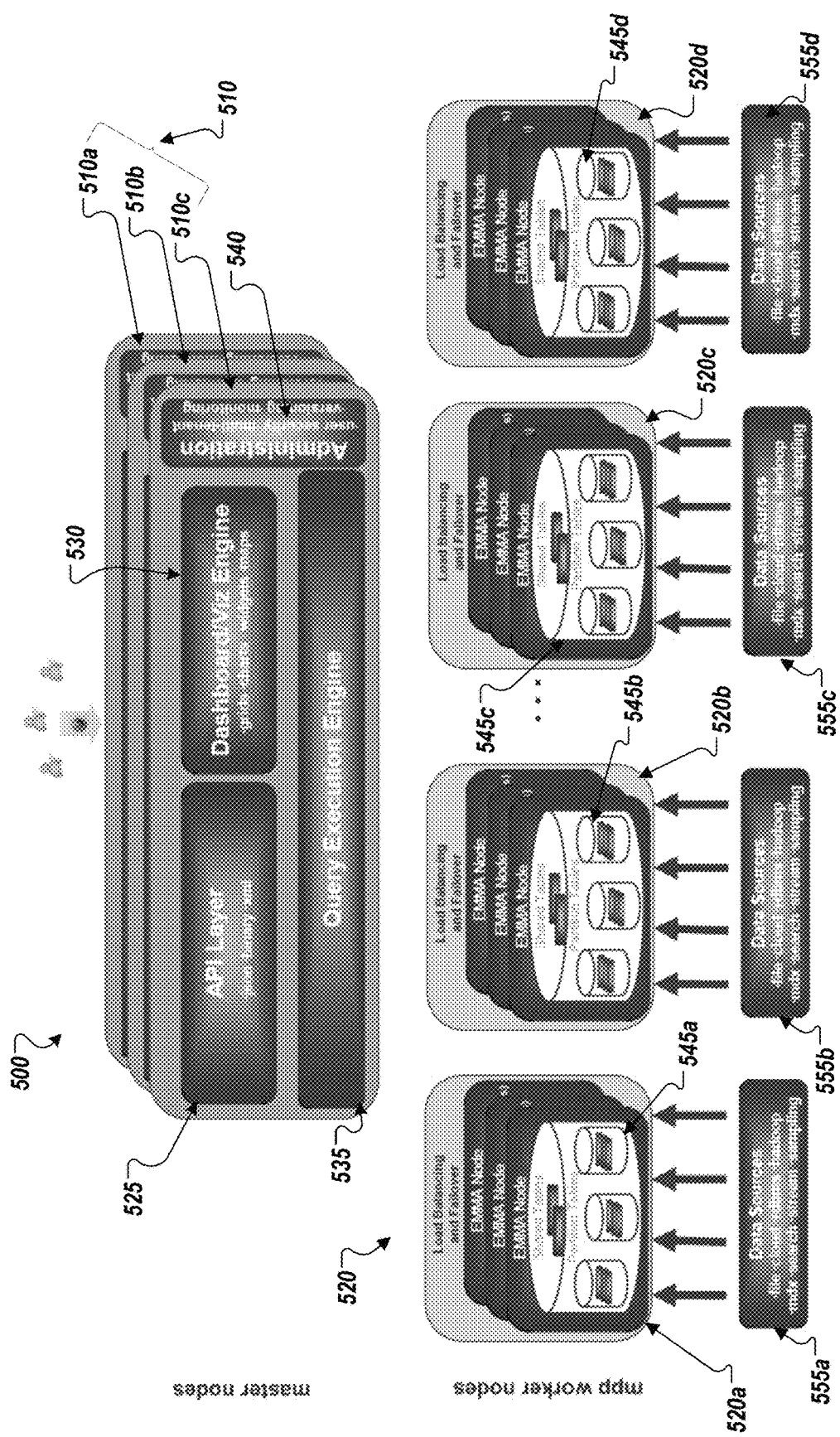
FIG. 5 is a block diagram illustrating an example system with multiple nodes.

FIG. 5 illustrates an example system 500 with multiple nodes 510, 520. The system 500 includes master nodes 510, further delineated as master nodes 510a-c, and worker nodes 520, further delineated as worker nodes 520a-d. Although FIG. 5 illustrates three master nodes 510a-c and four worker nodes 520a-d, the system 500 can include more (perhaps, many more) or fewer master nodes 510a-c and worker nodes 520a-d.

As shown, each of the master nodes 510a-c includes an API layer 525, a dashboard and/or visualization engine 530, a query execution engine 535, and an administration engine 540. The API layer, dashboard/visualization engine 530, and query execution engine 535 can be similar to the API layer 430, the dashboard/visualization engine 440, and the query execution engine 470 described above with respect to FIG. 4, except with for query execution engine 470 operating over multiple, different worker nodes 520a-d. Administration engine 540 handles administration functionality for the corresponding master node 510, including user security, multi-tenant administration, versioning, and process monitoring. Each of master nodes 510a-c can be operated on a separate machine.

As shown, each of the worker nodes 520a-d includes a corresponding in-memory analytic data store 545a-d, each of which can be similar to the in-memory data store 480 described above with respect to FIG. 4. Each of worker nodes 520a-d can perform load balancing and failover operations for its own in-memory analytic data store nodes and/or across all of the worker nodes 520. In this regard, in some implementations, a status of a node is monitored. If, for example, a node (or a core within the node) fails or the load on a node (or a core within the node) exceeds a predetermined maximum, its load is immediately redistributed across the remaining nodes (or cores). For example, if an abnormal condition state is detected with respect to one or more nodes (or cores in the nodes), a failover can be effected to another one of the plurality of nodes (or processor cores) to ensure continued operation.

Each of the worker nodes 520a-d can receive data from multiple large volume data sources and load the received data in parallel as described above. For example, each worker node 520a-d can be in communication with one or more corresponding data sources 555a-d. Although FIG. 5 illustrates a one-to-one correspondence between worker nodes 520a-d and data sources 555a-d, it should be understood that any variation of relationships between the worker nodes 520-a-d and data sources 555a-d is possible. For example, a single data source, e.g., data source 555a (say, a Hadoop system), can provide data to all four worker nodes 520a-d. The data sources 555a-d can include high volume data storage systems. Accordingly, a data services engine (e.g. data service engine 490 of FIG. 4) can load data from the data sources 555a-d in parallel into the in-memory data stores 545a-d. In some implementations, the loaded data can be all of the market intelligence data needed to generate output through a dashboard/visualization engine.

In some implementations, the raw data from one or more information sources, e.g., a Hadoop system, can be processed before being loaded (e.g. via data service engine 490 of FIG. 4) to an in-memory analytic data store. An example implementation of an interface for such processing is described in U.S. provisional Application No. 61/932,099, filed Jan. 27, 2014.

The system 500 can be configured differently depending on the type of application and the amount of data needed to support the application. For instance, for a market intelligence application that uses 2.2 billion rows, the system 500 can have a memory footprint of 59 GB and can have a hardware configuration of a single server with 32 cores and 1 TB of RAM. For a social media application that uses 2.8 billion rows, the system 500 can have a memory footprint of 100 GB and can have a hardware configuration of a single server with 40 cores and 1 TB of RAM. For an e-commerce application that uses 3.8 billion rows, the system 500 can have a memory footprint of 500 GB and can have a hardware configuration of a single server with 80 cores and 1 TB of RAM. For a social media application that uses 80 billion rows, the system 500 can have a memory footprint of 5-6 TB and can have a hardware configuration of 100 worker nodes, each with 16 cores and 144 GB of RAM, which results in a total of 1600 cores and 14 TB of RAM.

The system 500 can be configured to support use case characteristics with data volume in the 100's of GB to 1 TB range. In these cases, the system 500 can provide fast response time, as all executions are against in-memory datasets and datasets and queries are partition-friendly. The system 500 can serve mostly external-facing applications, although some applications can be internal.

FIG. 6 illustrates an example user interface 600 of an intelligence dashboard. As shown, interface 600 comprises a plurality of control objects 610-640. For example, control objects include grids (e.g. data displayed in table format), graphs, text fields, shapes, etc. that users can use to navigate through the data presented through interface 600. Interface 600 can be powered by the in-memory analytic data store described throughout this disclosure (e.g., in-memory analytic data store 312 of FIG. 3). In this regard, in some implementations, the analytic data store powers an extensive market intelligence network that provides the data shown in user interface 600. For example, computer systems implementing the techniques described herein (e.g. computer system 300 of FIG. 3) uses information about an application and/or design aspects of dashboard 600 to generate queries to the in-memory data store.

For example, all of the market intelligence data used by and displayed through the intelligence dashboard interface 600 can be loaded into the in-memory analytic data store. In this example, user interface 600 receives user input defining filter criteria 610 related to the market intelligence information a user seeks. Filter criteria 610 can include demographics data or any other type of data as shown in interface 600 or otherwise available to filter the market intelligence data stored in the in-memory analytic data store. For example, the user may be able to filter the data by gender, age, relationship status, education level, income bracket, urbanicity, etc. A query execution engine (e.g. query execution engine 470 of FIG. 4) can receive the user input defining filter criteria 610, and execute queries (e.g. queries 324a-c of FIG. 3) to access the market intelligence data stored in an in-memory analytic data store. In some examples, the query execution engine can receive the accessed data (e.g. data from the in-memory analytic data that complies with the filter criteria 610), perform analytics on the accessed data, and output the results of the analytics to user interface 600.

As shown in FIG. 6, the user interface 600 specifies the demographic data used to generate the dashboard output broken down into various categories 620 (e.g. as shown in charts 618a-c) and outputs ranked lists of interests 622-a-e for people that fall within the demographic profile 640 defined by the filter criteria 610. For example, the categories 620 can include what percentage of the relevant population is married, has attended college, or lives in an urban area. Other types of output and data visualization can be used. In addition, the user interface 600 can receive additional user input to refine or change the filter criteria 610 or the results sought and the user interface 600 can dynamically update in short order given the in-memory data retrieval and processing that occurs responsive to the additional user input.

Figure 7:
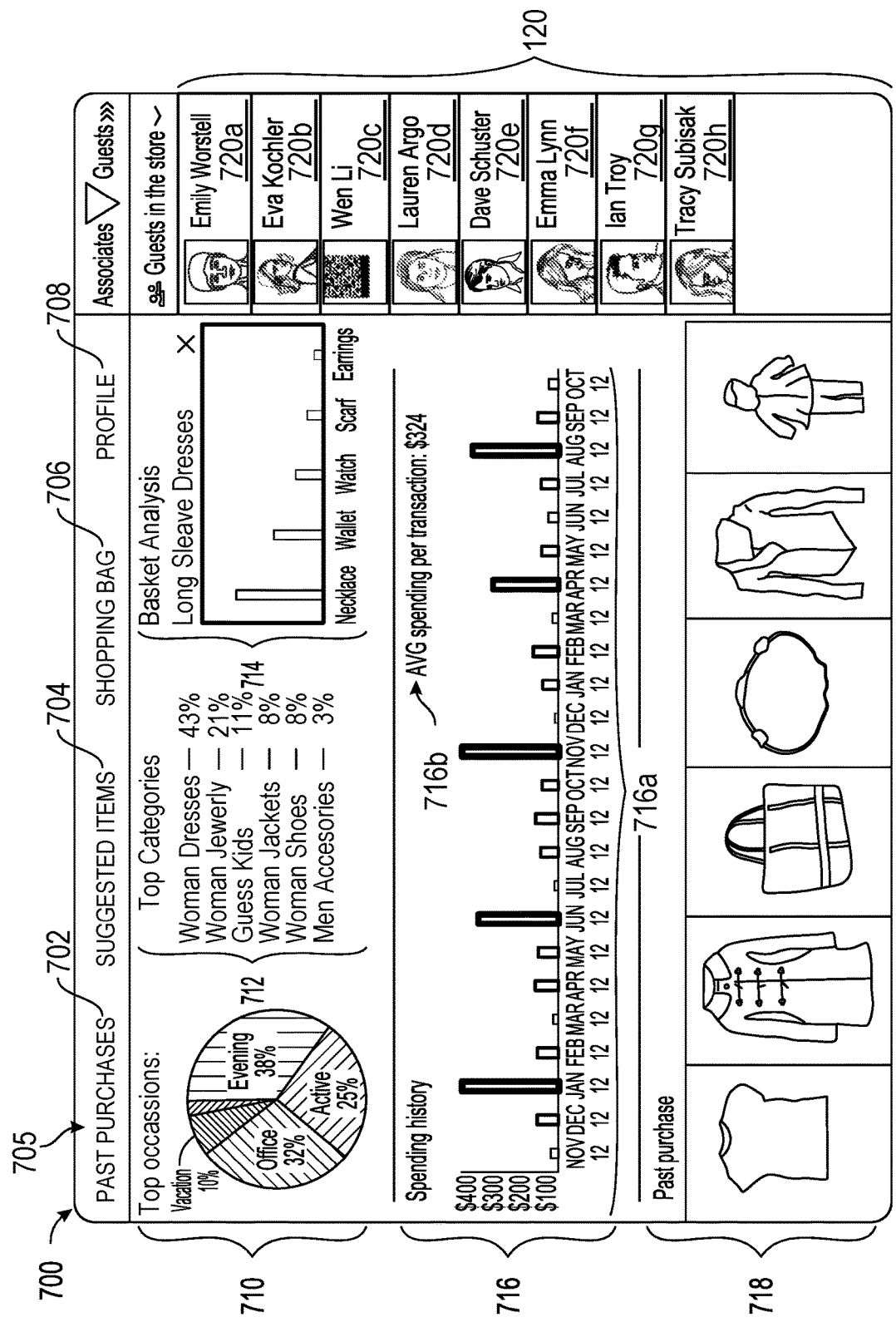

By way of example, FIG. 7 shows a user interface 700 of an intelligence dashboard also powered by an analytical in-memory data store (e.g., in-memory analytic data store 312 of FIG. 3). Interface 700 displays a customer report 705 to, e.g., a sales associate in a retail store. In an example, the sales associate can view the customer report 705 on a store computer.

In some examples, graphical user interface 700 includes customer portion 720 that displays information indicative of customers who are, e.g. in a particular geographic location (say, the retail store). Customer portion 720 displays customer information 720a-720h, with each item of customer information 720a-720h representing a customer. A user can select customer information 720a-720h by, for example, using a mouse to click on, or using a touch screen display to touch, a desired item of customer information 720a-720h. When an item of customer information 720a-720h is selected, interface 700 displays information pertaining to the selected customer. In the interface 700 of FIG. 7, a viewer of graphical user interface 700, e.g., the sales associate, has opted to view information associated with the customer represented by customer information 720a.

A query execution engine (e.g. query execution engine 470 of FIG. 4) can receive the user input, e.g., selection of customer information 720a-720h, and execute queries (e.g. queries 324a-c of FIG. 3) to access the market intelligence data stored in an in-memory analytic data store. In some examples, the query execution engine can receive the accessed data (e.g. data from the in-memory analytic data that complies with the filter criteria 610), perform analytics on the accessed data, and output the results of the analytics to user interface 700.

As shown, interface 700 includes past purchases link 702, selection of which causes interface 700 to display information indicative of past purchases of the customer that is selected via customer portion 720. Interface 700 also includes suggested items link, selection of which causes interface 700 to display suggestions information 704 indicative of suggested items that a particular customer (e.g., the customer selected from customer portion 720) may be interested in and want to purchase. Suggestions information 704 can based on analyzing data that is retrieved from an in-memory analytic data store. For example, suggestions information 704 can be based on customers' past purchases. Interface 700 includes shopping bag link 706, selection of which causes graphical user interface 700 to display items that a particular customer wishes to purchase. Interface 700 includes profile link 708, selection of which causes interface 700 to be updated to display a customer profile of a particular customer (e.g., the customer selected via currently present customer portion 720).

Interface 700 includes top occasions portion 710 that displays information (e.g., a graph) indicative of the top occasions for which a particular customer (e.g., customer 720a) has purchased merchandise. Information for top occasions portion 710 can be generated based on analytics performed on market intelligence data contained in an in-memory data store. In this example, top occasions portion 710 is generated by tracking past purchases of the customer and then categorizing the types of purchase (e.g., based on various occasions). In another example, top occasions portion 710 displays information indicative of the top occasions for a group of customers, e.g., rather than displaying the top occasions for a particular customer.

Interface 700 also displays top categories information 712, e.g., information specifying top categories of goods that have been purchased by a particular customer and/or by a group of customers at a retail store. Information for top categories portion 710 can be generated based on analytics performed on market intelligence data pertaining to the particular customer and/or the group of customers contained in an in-memory data store. In some implementations, interface 700 can include basket analysis portion 714—for display of information indicative of types of goods that are currently in an electronic shopping cart of a customer.

Graphical user interface 700 also includes spending history portion 716 to display information indicative of how much money a particular customer (e.g., the customer selected in portion 720) has spent with the retailer over a period of time. Information for spending history portion 716 can be generated based on analytics performed on market intelligence data pertaining to the particular customer contained in an in-memory data store. Spending history portion 716 can include a timeline 716a, e.g., a representation of the period of time over which spending is tracked. Spending history portion 716 also includes information 716b that specifies an average amount of money a particular customer has spent with the retailer over a period of time. Interface 700 also includes portion 718 for display of information indicative of past purchases and/or transactions of a particular customer.

Figure 8:
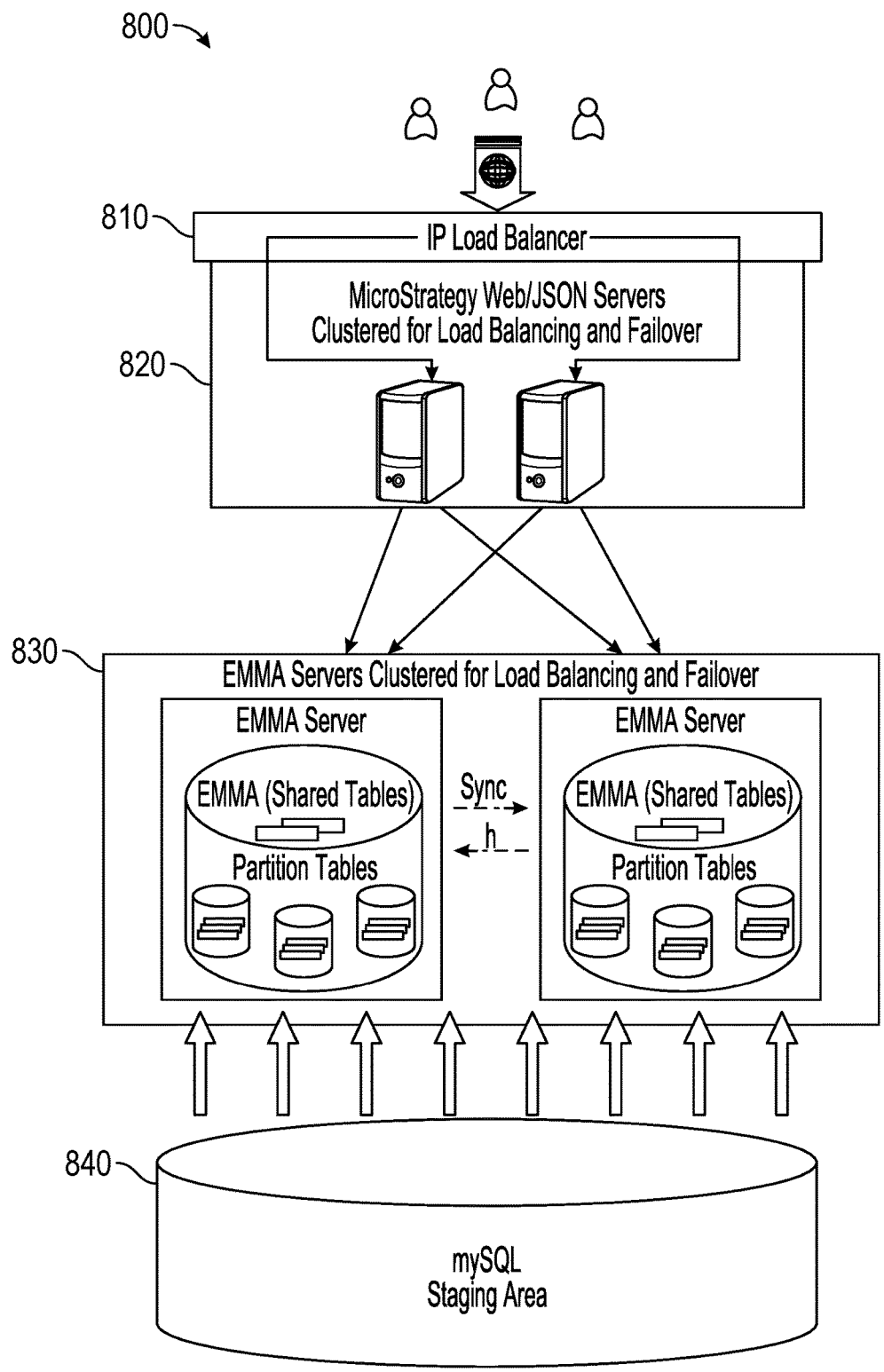
FIGS. 8 and 9 are block diagrams illustrating example topologies for applications leveraging an in-memory, distributed, analytic data store.
Figure 9:
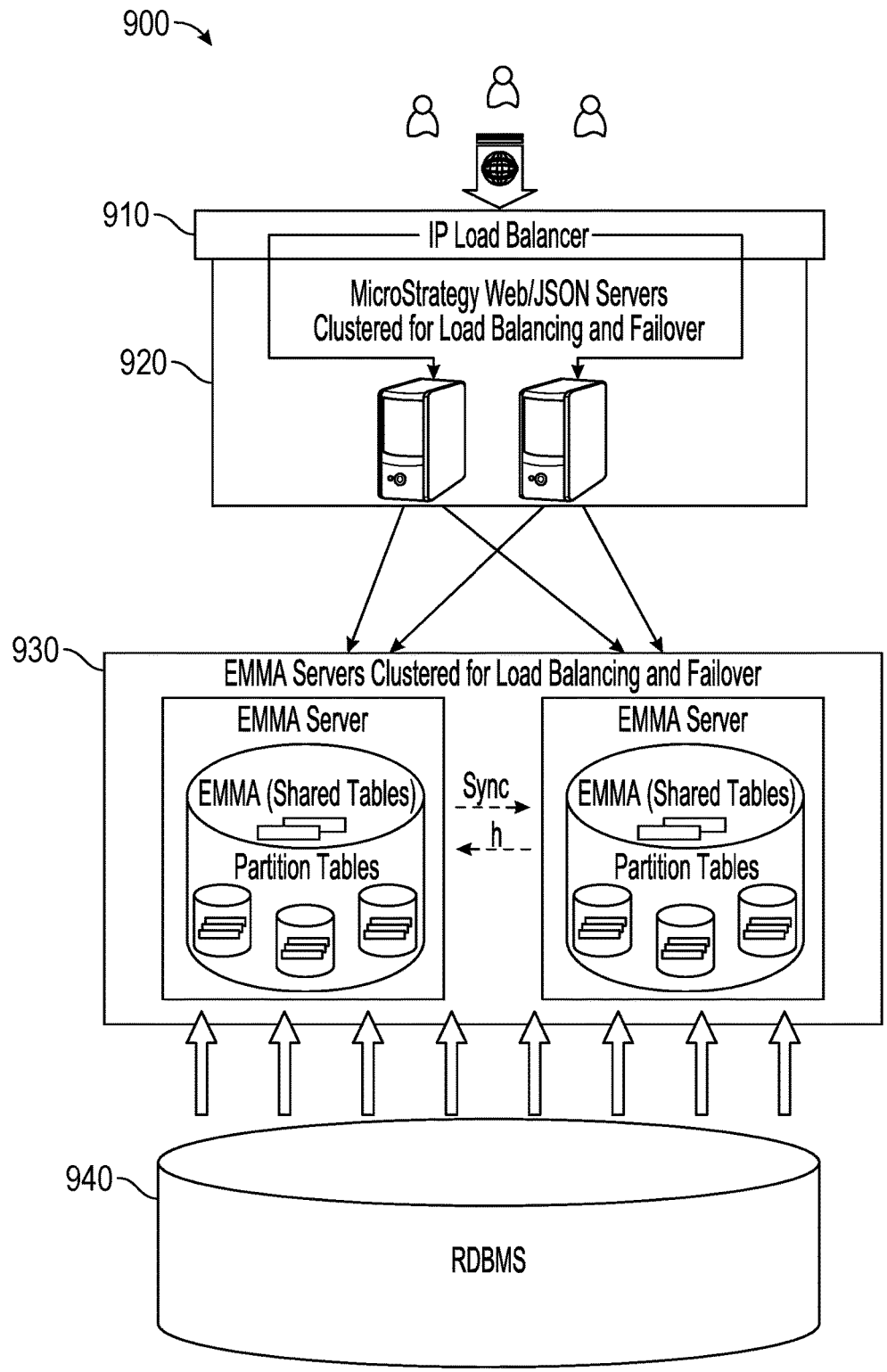

FIGS. 8 and 9 illustrate example topologies for applications leveraging an in-memory, distributed, analytic data store. In FIG. 7, an example topology 800 includes an Internet Protocol (IP) load balancer 810, multiple web server nodes 820, multiple in-memory analytic data store nodes 830, and a data staging area 840. The IP load balancer 810 receives user requests over the Internet and balances the user requests across the web server nodes 820. The web server nodes 820 process the user requests and access data needed to serve the user requests from the multiple in-memory analytic data store nodes 830. Each web server node can use the operating system RHEL 6.2, can have a 12 core Intel Xeon @ 2.24 GHz central processing unit, and can have 32 GB of RAM.

The multiple in-memory analytic data store nodes 830 store data in a partitioned manner and perform parallel processing of the partitioned data. The multiple in-memory analytic data store nodes 830 are clustered for load balancing and failover and serve queries/requests from the web server nodes 820. The multiple in-memory analytic data store nodes 830 communicate with one another to perform synchronization of changes made to the dataset. Each in-memory analytic data store node can use the operating system RHEL 6.2, can have a 32 core Intel Xeon @ 2.24 GHz central processing unit, and can have 1 TB of RAM. The full dataset can be replicated on each server.

The data staging area 840 accesses data to be loaded into the in-memory analytic data store nodes 830. The data staging area 840 stages the data in a manner that enables parallel loading of the data into the in-memory analytic data store nodes 830.

In FIG. 9, an example topology 900 includes an IP load balancer 710, multiple web server nodes 920, multiple in-memory analytic data store nodes 930, and a relational database management system (RDBMS) 940. The IP load balancer 910 receives user requests over the Internet and balances the user requests across the web server nodes 920. The web server nodes 920 process the user requests and access data needed to serve the user requests from the multiple in-memory analytic data store nodes 930. Each web server node can use the operating system Windows Server 2003 Enterprise x64 Edition (SP2), can have a Quad Core Intel Xeon L5520 @ 2.27 GHz central processing unit, and can have 6 GB of RAM.

The multiple in-memory analytic data store nodes 930 store data in a partitioned manner and perform parallel processing of the partitioned data. The multiple in-memory analytic data store nodes 930 are clustered for load balancing and failover and serve queries/requests from the web server nodes 920. The multiple in-memory analytic data store nodes 930 communicate with one another to perform synchronization of changes made to the dataset. Each in-memory analytic data store node can be a model Sun Fire X4800 M2 server, can use the operating system RHEL 6.1, can have an 80 core Intel Xeon @ 2.40 GHz with hyper threading central processing unit, and can have 1 TB of RAM. The full dataset can be replicated on each server.

The RDBMS 940 stores data to be loaded into the in-memory analytic data store nodes 930. In some implementations, the RDBMS 940 loads data into the in-memory analytic data store nodes 930 in parallel.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications can be made without departing from the spirit and scope of the disclosure. Accordingly, other implementations are within the scope of the disclosure.

What is claimed is:

1. A computer-implemented method comprising:
   receiving, by a data storage system that includes a number of independent data partitions that each store a stored number of data items, input that requests a number of data items that are highest ranking in the data storage system based on a characteristic of each data item;
   determining a load of the data storage system;
   based on the load of the data storage system, determining a confidence threshold that reflects an acceptable probability that a given number of highest ranking data items from each independent data partition includes the requested number of data items that are highest ranking in the data storage system;
   based on (i) the number of independent data partitions, (ii) the stored number of data items in each independent data partition, and (iii) the requested number of data items, determining a particular number of highest ranking data items to request from each of the independent data partitions to satisfy the confidence threshold that all of the highest ranking data items requested from the independent data partitions include the requested number of data items that are highest ranking in the data storage system;
   accessing, from each of the independent data partitions, the particular number of the highest ranking data items;
   comparing all of the highest ranking data items accessed from the independent data partitions;
   based on comparing all of the highest ranking data items accessed from the independent data partitions, selecting, from among all of the highest ranking data items accessed from the independent data partitions, the requested number of the data items that are ranked highest based on the characteristic;
   providing, for output, the selected number of the data items;
   accessing, from each of the independent data partitions, the requested number of the data items that are ranked highest in each independent data partition; and
   based on the requested number of the data items that are ranked highest in each independent data partition, increasing or decreasing, for subsequent data requests, the particular number of the highest ranking data items selected from each of the independent data partitions.

2. The method of claim 1, wherein the particular number of highest ranking data items accessed from each of the independent data partitions is equal to the number of the data items that are highest based on the characteristic.

3. The method of claim 1, comprising:
   associating each of the independent data partitions with at least one of a plurality of processing units such that data items in a corresponding independent data partitions are processed by the at least one of the plurality of processing units; and
   providing a query execution engine for causing the plurality of processing units to execute, in parallel, a series of data requests to the independent data partitions.

4. The method of claim 3, wherein the independent data partitions are distributed over a plurality of nodes, each node comprising one or more of the plurality of processing units.

5. The method of claim 3, wherein:
   determining a load of the data storage system comprises monitoring a processing status of the plurality of processing units, and
   determining the confidence threshold that reflects the acceptable probability that the given number of highest ranking data items from each independent data partition includes the requested number of data items that are highest ranking in the data storage system comprises balancing a processing load across the plurality of processing units.

6. The method of claim 1, wherein providing, for output, the selected number of data items comprises presenting, within a dashboard, a visualization of the selected number of data items.

7. The method of claim 6, comprising:
   generating a data query based on data inputted into the dashboard.

8. The method of claim 1, comprising:
   identifying independent data partitions that are associated with each of the selected number of the data items;
   determining that each of the selected number of the data items is associated with a same independent data partition; and
   accessing each data item that is stored in the same independent data partition.

9. The method of claim 1, wherein the particular number of highest ranking data items is less than the requested number of data items that are highest ranking in the data storage system based on the characteristic.

10. A system comprising:
    one or more computers and one or more storage devices storing instructions that are operable, when executed by the one or more computers, to cause the one or more computers to perform operations comprising:
       receiving, by a data storage system that includes a number of independent data partitions that each store a stored number of data items, input that requests a number of data items that are highest ranking in the data storage system based on a characteristic of each data item;

determining a load of the data storage system;
based on the load of the data storage system, determining a confidence threshold that reflects an acceptable probability that a given number of highest ranking data items from each independent data partition includes the requested number of data items that are highest ranking in the data storage system;
based on (i) the number of independent data partitions, (ii) the stored number of data items in each independent data partition, and (iii) the requested number of data items, determining a particular number of highest ranking data items to request from each of the independent data partitions to satisfy the confidence threshold that all of the highest ranking data items requested from the independent data partitions include the requested number of data items that are highest ranking in the data storage system;
accessing, from each of the independent data partitions, the particular number of the highest ranking data items;
comparing all of the highest ranking data items accessed from the independent data partitions;
based on comparing all of the highest ranking data items accessed from the independent data partitions, selecting, from among all of the highest ranking data items accessed from the independent data partitions, the requested number of the data items that are ranked highest based on the characteristic;
providing, for output, the selected number of the data items;
accessing, from each of the independent data partitions, the requested number of the data items that are ranked highest in each independent data partition; and
based on the requested number of the data items that are ranked highest in each independent data partition, increasing or decreasing, for subsequent data requests, the particular number of the highest ranking data items selected from each of the independent data partitions.

11. The system of claim 10, wherein the particular number of highest ranking data items accessed from each of the independent data partitions is equal to the number of the data items that are highest based on the characteristic.

12. The system of claim 10, wherein the operations further comprise:
associating each of the independent data partitions with at least one of a plurality of processing units such that data items in a corresponding independent data partitions are processed by the at least one of the plurality of processing units; and
providing a query execution engine for causing the plurality of processing units to execute, in parallel, a series of data requests to the independent data partitions.

13. The system of claim 10, wherein providing, for output, the selected number of data items comprises presenting, within a dashboard, a visualization of the selected number of data items.

14. The system of claim 13, wherein the operations further comprise:
generating a data query based on data inputted into the dashboard.

15. The system of claim 12, wherein the independent data partitions are distributed over a plurality of nodes, each node comprising one or more of the plurality of processing units.

16. The system of claim 12, wherein:
determining a load of the data storage system comprises monitoring a processing status of the plurality of processing units, and
determining the confidence threshold that reflects the acceptable probability that the given number of highest ranking data items from each independent data partition includes the requested number of data items that are highest ranking in the data storage system comprises balancing a processing load across the plurality of processing units.

17. The system of claim 10, wherein the operations further comprise:
identifying independent data partitions that are associated with each of the selected number of the data items;
determining that each of the selected number of the data items is associated with a same independent data partition; and
accessing each data item that is stored in the same independent data partition.

18. The system of claim 10, wherein the particular number of highest ranking data items is less than the requested number of data items that are highest ranking in the data storage system based on the characteristic.

19. A non-transitory computer-readable medium storing software comprising instructions executable by one or more computers which, upon such execution, cause the one or more computers to perform operations comprising:
receiving, by a data storage system that includes a number of independent data partitions that each store a stored number of data items, input that requests a number of data items that are highest ranking in the data storage system based on a characteristic of each data item;
determining a load of the data storage system;
based on the load of the data storage system, determining a confidence threshold that reflects an acceptable probability that a given number of highest ranking data items from each independent data partition includes the requested number of data items that are highest ranking in the data storage system;
based on (i) the number of independent data partitions, (ii) the stored number of data items in each independent data partition, and (iii) the requested number of data items, determining a particular number of highest ranking data items to request from each of the independent data partitions to satisfy the confidence threshold that all of the highest ranking data items requested from the independent data partitions include the requested number of data items that are highest ranking in the data storage system;
accessing, from each of the independent data partitions, the particular number of the highest ranking data items;
comparing all of the highest ranking data items accessed from the independent data partitions;
based on comparing all of the highest ranking data items accessed from the independent data partitions, selecting, from among all of the highest ranking data items accessed from the independent data partitions, the requested number of the data items that are ranked highest based on the characteristic;
providing, for output, the selected number of the data items;
accessing, from each of the independent data partitions, the requested number of the data items that are ranked highest in each independent data partition; and
based on the requested number of the data items that are ranked highest in each independent data partition, increasing or decreasing, for subsequent data requests, the particular number of the highest ranking data items selected from each of the independent data partitions.

20. The medium of claim 19, wherein the particular number of highest ranking data items accessed from each of the independent data partitions is equal to the number of the data items that are highest based on the characteristic.

* * * * *